United States Patent [19]

Skorpenske et al.

[11] Patent Number: 5,182,310
[45] Date of Patent: Jan. 26, 1993

[54] ISOCYANATE-REACTIVE COMPOSITION AND PROCESS FOR PREPARING A FLEXIBLE POLYURETHANE FOAM

[75] Inventors: Richard G. Skorpenske; Alan K. Schrock, both of Lake Jackson, Tex.

[73] Assignee: Dow Chemical Company, Midland, Mich.

[21] Appl. No.: 736,270

[22] Filed: Jul. 25, 1991

[51] Int. Cl.$^5$ .............................. C08G 18/14
[52] U.S. Cl. .................... 521/116; 521/117; 521/118; 521/166; 521/170; 521/172; 521/173; 521/174; 521/176; 252/182.24; 252/182.26; 252/182.27

[58] Field of Search ............. 521/116, 117, 118, 166, 521/170, 172, 173, 174, 176; 252/182.24, 182.26, 182.27

[56] References Cited

U.S. PATENT DOCUMENTS

| | | | |
|---|---|---|---|
| 3,644,486 | 2/1972 | Boldt et al. | 260/479 R |
| 3,772,218 | 11/1973 | Lamplugh et al. | 260/2.5 BB |
| 3,944,594 | 3/1976 | Kleiner et al. | 260/473 S |
| 4,007,230 | 2/1977 | Hinze | 260/611.5 |
| 4,265,783 | 5/1981 | Hinze | 252/182 |
| 4,275,173 | 6/1981 | Hinze | 521/117 |
| 4,363,745 | 12/1982 | Hinze | 252/402 |
| 4,677,154 | 6/1987 | Narayan et al. | 524/710 |
| 4,725,636 | 2/1988 | Kausch et al. | 524/251 |

OTHER PUBLICATIONS

G. L. Statton et al., "Evaluation of Hindered Phenols for Minimization of Foam Discoloration Using the Microwave Scorch Test", J. Cell. Plastics, Sep./Oct. 1984.

Primary Examiner—Maurice J. Welsh

[57] ABSTRACT

The present invention refers to isocyanate-reactive compositions containing hindered phenolic antioxidants having a molecular weight of at least 700. These compositions, when used to prepare flexible polyurethane foams, especially slabstock foam, provide foams which exhibit a significant reduction of scorch.

18 Claims, No Drawings

ISOCYANATE-REACTIVE COMPOSITION AND PROCESS FOR PREPARING A FLEXIBLE POLYURETHANE FOAM

BACKGROUND OF THE INVENTION

The present invention relates to isocyanate-reactive compositions and process for preparing a flexible polyurethane foam using phenolic antioxidants. More particularly, this invention concerns high molecular weight phenolic antioxidants and their use in flexible polyurethane foams.

Flexible polyurethane foams, one of the largest segments of polyurethane foams, are useful for a wide range of applications. Their most common uses are in cushioning, as in furniture and automobiles, bedding, carpet backing, and other padding or cushioning applications.

Polyurethane foams have been conventionally prepared by reacting a high equivalent weight isocyanate-reactive compound, a polyisocyanate in the presence of a blowing agent. It is also well-known that useful blowing agents include, for example, air, water, low boiling liquids, such as chlorofluorocarbon, or mixtures thereof. In preparing flexible polyurethane foams, water has been the preferred blowing agent.

A persisting problem, however, in the preparation of flexible polyurethane foams, especially in slabstock-type foams, is foam polymer degradation resulting in discoloration (herein also referred to as "scorch").

Scorch is a well-known thermoxidative process caused by the heat released from the exothermic reaction between water and the isocyanate. This thermoxidative process may be further exacerbated by the ambient heat and humidity conditions and can reach levels of self-ignition of the foam. Therefore, scorch is considered one of the most serious issues since it represents a potential fire hazard for the foam manufacturers. Scorch is normally expressed as a function of coloration of the foam which is expressed as ΔE. The higher ΔE, the higher the scorch of the foam.

Due to the growing efforts to reduce the use of chlorofluorocarbons (CFC) blowing agents in the foam formulations by substituting part of it with water, thereby increasing the overall water content scorch has been more frequently addressed. These foam formulations may contain up to about 6 or more parts of water per hundred parts (pph) of isocyanate-reactive compound instead of the usual 2 to 3 pph of water and are commonly called high water formulations.

Scorch, which usually appears as a faint to severe discoloration in the center of a foam, is more likely to occur in slabstock foams. Due to the low thermal conductivity of the foamed materials, the dissipation of the heat occurs only very slowly. Thus, the interior of a slabstock foam bun can reach temperatures between about 140° C. to about 170° C., thereby contributing to the polymer degradation or discoloration and is more frequently encountered in high water slabstock foam formulations. The higher the water content in the foam formulation the more susceptible it is to the scorch phenomena. In addition to reducing the aesthetic value of the foam due to the discoloration to the point of the product being considered scrap or without any commercial value, scorch adversely affects several important physical properties of the foam, such as, for example, tensile strength, tear strength, elongation and compression set.

It is also well-known that the thermoxidative process or degradation process is caused by the free radical mechanism and can be controlled to a certain degree by adding antioxidants to the foam formulations in order to reduce their degradation. In flexible polyurethane foams, for example, antioxidants are normally added to the isocyanate-reactive compound, prior to the foaming step, in order to reduce foam discoloration and loss of physical properties. However, the discoloration problem is still encountered to some extent in the resultant slabstock foams.

In view of the above mentioned deficiencies, efforts are being made to ways to reduce or even eliminate the scorch phenomenon in flexible polyurethane foams.

Currently, scorch in flexible foams is being controlled by adding low molecular weight hindered phenolic antioxidants, i.e., molecular weight of from about 200 to about 550, in conjunction with other inhibitors to the formulation. U.S. Pat. Nos. 4,007,230; 4,265,783; 4,275,173 and 4,363,745 to Hinze et al., for example, cover flexible polyurethane foams prepared from polyols stabilized with the above-mentioned low molecular weight antioxidants. Unfortunately, all these efforts were not sufficient to effectively control and/or eliminate the scorch problem.

Higher molecular weight antioxidants, i.e., molecular weights above 550, have been disclosed, for example, in U.S. Pat. Nos. 3,644,482 and 3,944,594. These patents relate to hindered phenolic esters of oligomeric glycols and thioglycols used as stabilizer in plastic materials, such as polypropylene, polyurethane, polyacetals, nylon, EPDM rubber, SBR rubber and polybutadiene.

U.S. Pat. No. 3,722,218 discloses a stabilizer system comprising a primary antioxidant, such as a high molecular weight hindered phenolic compound, a second high molecular weight phosphite antioxidant and an ultraviolet absorbing compound. However, the hindered phenolic antioxidants, taught as having high molecular weights, present a molecular of 520 or less. This system is useful in flexible, open-cell polyurethane foam.

U.S. Pat. No. 4,677,154 relates to a stabilizer package for polyurethanes comprising a substituted cresol and a high molecular weight phosphorus compound.

However, none of the above described references achieves a satisfying control and/or reduction of the scorch phenomena. It would, therefore, be most desirable to provide an effective antioxidant for use in the preparation of polyurethane foams so as to significantly reduce scorch.

SUMMARY OF THE INVENTION

In one aspect, the present invention is an isocyanate-reactive composition comprising an isocyanate-reactive compound having an equivalent weight (EW) of from about 400 to about 5,000, and a hindered phenolic antioxidant having a molecular weight greater than about 700 in an amount sufficient to reduce scorch up to about 50 percent when compared to a similar isocyanate-reactive composition having an equal number of equivalents of 2,6-di-tert-butyl-4-methylphenol (BHT).

Another aspect of the present invention is a process for preparing a flexible polyurethane foam comprising reacting together an organic polyisocyanate with an isocyanate-reactive composition comprising an isocyanate-reactive compound having an EW of from about 400 to about 5,000, and an antioxidant comprising a hindered phenolic compound having a molecular weight greater than about 700 in an amount sufficient to reduce scorch up to about 50 percent when compared to a similar isocyanate-reactive composition having an equal number of equivalents of 2,6-di-tert-butyl-4-methylphenol, in the presence of a blowing agent and under conditions sufficient to form the polyurethane foam.

In a third aspect, the present invention is a flexible polyurethane foam prepared from the isocyanate-reactive composition of the first aspect of the invention.

DETAILED DESCRIPTION OF THE INVENTION

Isocyanate-reactive compounds useful in the present invention include active hydrogen containing compounds, such as, for example polyols, amine-terminated compounds, secondary amines, and imines.

The isocyanate-reactive compound has an equivalent weight suitable for the preparation of flexible polyurethane foam. Advantageously, it has an equivalent weight from about 400 to about 5000, preferably about 800 to about 3000, more preferably about 1000 to about 2500. In general, the isocyanate-reactive compound also advantageously has an average functionality from about 1.5 to about 5, more preferably about 1.6 to about 4, and most preferably about 1.8 to about 3.0. When the polyisocyanate is MDI or based on MDI, the isocyanate-reactive compound advantageously has an average functionality of about 1.5 to about 3.5, more preferably about 1.8 to about 2.1. With respect to isocyanate-reactive compound, and cross-linkers and chain extenders used in this invention, the term functionality refers to the average number of groups per molecule which contain one or more active hydrogen atoms.

Suitable polyols include, for example, polyester polyol, or a polyether polyol containing at least 50 weight percent of oxyalkylene units, an amine-terminated derivative of such polyester or polyether polyol, or a polymer polyol based on such polyester or polyether polyol. Such polyols generally process well to provide a polyurethane foam having good properties. Of these, the polyether polyols themselves, amine-terminated derivatives thereof and polymer polyols based on the polyether polyol are preferred.

Most preferred materials used as isocyanate-reactive compound herein are polymers of propylene oxide having an average functionality of about 2.0 to about 3.5 and an equivalent weight of about 900–2000 which are optionally copolymerized with about 1 to 80, preferably 10 to 30 weight percent ethylene oxide or end-capped with up to about 30, preferably up to about 20 weight percent ethylene oxide, as well as amine-terminated derivatives thereof and polymer polyols prepared therefrom, and mixtures thereof.

The amine-terminated derivatives of the polyether polyols can be prepared in the reductive amination of the polyether polyol using ammonia or a primary amine. Alternatively, the amine-terminated derivative can be prepared by reductively aminating the polyol with ammonia and then reacting the resulting primary amine with an ethylenically unsaturated compound such as acrylonitrile to form the corresponding secondary amine, as described in U.S. Pat. No. 3,236,895. Aromatic, amine-terminated polyether can be prepared by reacting the polyol with a diisocyanate, followed by hydrolyzing the free isocyanate groups to amine groups, as described, for example, in U.S. Pat. No. 4,578,500. Alternatively, the polyol can be reacted with a material such as o- or p-chloronitrobenzene to form an ether, followed by reduction of the nitro groups to corresponding amine group, as described in U.S. Pat. No. 4,847,416, incorporated herein by reference.

Several types of polymer polyols based on polyether or polyester polyols are useful as isocyanate-reactive compound in this invention. In this invention, a polymer polyol refers to a dispersion of a polymer in a continuous polyol phase. The dispersed polymer can be a polymer of one or more ethylenically unsaturated monomers, an epoxy resin, a polyurethane or a polyurea. Of these, dispersions of styrene and/or acrylonitrile polymer and copolymers, polyurea dispersions (the so-called ("PHD polyols") and polyurea-polyurethane dispersions (the so-called PIPA polyols) are preferred. Such dispersions are described, for example, in U.S. Pat. Nos. 4,374,209, 4,092,275 and 4,042,537, incorporated herein by reference.

It should be understood that a significant scorch reduction in slabstock foams may be achieved as long as the antioxidants used in the present invention are hindered phenolic compounds having a molecular weight of at least about 700, more preferably in the range of about 750 to about 1,200. The antioxidant useful in the present invention should be employed in an amount sufficient to reduce scorch up to about 50 percent when compared to a similar isocyanate-reactive composition having an equal number of equivalents of 2,6-di-tert-butyl-4-methylphenol.

By "hindered phenolic compound" as used herein is meant any phenolic compound which is sterically hindered by one of its substituents. A typical substituent useful to provide sterical hindrance includes, for example, a tertiary butyl group.

Representatives of antioxidants having a molecular weight of at least 600 useful in present invention include, for example, tris-(3,5-di-t-butyl-4-hydroxybenzyl)isocyanurate; 3,5-di-tert-butyl-4-hydroxyhydrocinnamic acid triester of 1,3,5-tris-(2-hydroxyethyl)-s-triazine-2,4,6-(1H,3H,5H)-trione; 4,4'-butylidene-bis-(6-t-butyl-m-cresol); 2,2-bis[4-(2-(3,5-di-tert-butyl-4-hydroxyhydrocinnamoyloxy))ethoxyphenyl] propane; 1,1,3-tris-(2-methyl-4-hydroxy-5-t-butylphenyl) butane.

The present antioxidants can be employed alone or in addition to other commonly used low molecular weight antioxidants, such as, for example, hindered phenolic compounds and/or aromatic amines having a molecular weight of less than 600. Representative examples of such antioxidants include those disclosed by Hinze et al. in U.S. Pat. Nos. 4,007,230; 4,265,783: 4,275,173 and 4,363,745. However, the use of the high molecular weight antioxidants useful in the present invention in combination with above described low molecular weight antioxidants is less preferred. The amount in which the high molecular weight antioxidants are employed in the present invention depends on the low molecular weight antioxidants present, if any. Typically, the antioxidant useful in the present invention is employed in an amount of from about 0.25 to about 4.5 meq, more preferably from about 0.75 to about 3 meq, most preferably from about 1.0 to 2.0 meq, with 1.5 meq being especially preferred, per 100 g of isocyanate-reactive compound.

In its second aspect, the invention is a process for preparing a flexible polyurethane foam comprising reacting together an organic polyisocyanate with the isocyanate-reactive composition of the present invention, in the presence of a blowing agent and under conditions sufficient to form the polyurethane foam.

Suitable isocyanate-reactive compounds and antioxidants for use in the process of the present invention include any of those described above.

Any of the organic diisocyanates and polyisocyanates normally employed in the preparation of flexible polyurethane foams can be employed in the present invention. A preferred group of polyisocyanates comprises the aliphatic, cycloaliphatic and aromatic polyisocyanates.

Illustrative aliphatic and cycloaliphatic polyisocyanates, but non-limiting thereof, are ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate, 1,5-diisocyanato-3,3,5-trimethylcyclohexane, 2,4- and/or 2,6-hexahydrotoluene diisocyanate, perhydro-2,4'- and/or -4,4'-diphenylmethanediisocyanate ($H_{12}MDI$), isophorone diisocyanate, and the like.

Illustrative aromatic polyisocyanates, but non-limiting thereof, include, for example, 2,4- and/or 2,6-toluene diisocyanate (TDI), 2,4'-diphenylmethane-diisocyanate, 1,3- and 1,4-phenylene diisocyanate, 4,4'-diphenylmethane diisocyanate (MDI) (including mixtures thereof with minor quantities of the 2,4'-isomer), 1,5-naphthylene diisocyanate, triphenylmethane-4,4',4''-triisocyanate, polyphenylpolymethylene polyisocyanates, and the like.

The polyisocyanate is used in an amount sufficient to provide an isocyanate index of about 60–200, preferably about 80–150, more preferably about 90–125, most preferably about 95–110. At higher indices, trimerization of the polyisocyanate occurs, causing the foam to lose flexibility. At lower indices, insufficient curing occurs, causing the foam to have poor properties. When MDI or derivative thereof is used as the polyisocyanate, preferred isocyanate indices are from about 60–110, with 70–103 being more preferred, as MDI tends to provide a board-like foam at indices greater than about 110, but provides a highly resilient foam at indices as low as about 60. The "isocyanate index" is 100 times the ratio of isocyanate groups to isocyanate-reactive groups contained in the mixture which reacts to form the foam.

In addition, derivatives and prepolymers of the foregoing polyisocyanates such as those containing urethane, carbodiimide, allophanate, isocyanurate, acylated urea, biuret, ester and similar groups are useful herein.

The blowing agent, another component of the formulation, is any material which is capable of generating a gas under the conditions of the reaction of a polyisocyanate and a isocyanate-reactive compound. Such materials include air, carbon dioxide, nitrogen, water, formic acid, low-boiling halogenated alkanes, finely divided solids, the so-called "azo" blowing agents such as azobis(formamide) and the like. Preferred are water, the low-boiling halogenated alkanes, or mixtures thereof. Blowing agents are advantageously employed in a quantity sufficient to provide the foam with a bulk density from about 0.5, preferably about 0.9, more preferably about 1.0 to about 6 or less, preferably about 4, more preferably about 3 pounds per cubic foot. The halogenated alkanes, including methylene chloride, dichlorodifluoromethane, monochlorodifluoromethane, monochlorotrifluoromethane and the like, generally provide the desired density when employed in amounts from about 5 to about 50 parts per 100 parts isocyanate reactive compound. Lesser amounts are useful when employed in conjunction with another blowing agent, such as water.

Flexible polyurethane foam, preferably slabstock foam, is prepared according to this invention by contacting the various components under conditions such that the components react to form a cellular polymer. Generally, the reaction mixture may contain additional components such as catalysts, cross-linkers, surfactants, colorants, cell openers, flame retardants, antioxidants, mold release agents and the like, which may vary according to the desired attributes of the foam, and whether the foam is a molded or slabstock foam. The use of such additional components is well understood in the art.

A catalyst for the reaction of the isocyanate-reactive compound and the polyisocyanate is also advantageously used in making foam according to this invention. Although a wide variety of materials are known to be useful for this purpose, the most widely used and preferred catalysts are the tertiary amine catalysts and the organometallic catalysts.

Exemplary tertiary amine catalysts, include, for example, triethylenediamine, N-methyl morpholine, N-ethyl morpholine, diethyl ethanolamine, N-coco morpholine, 1-methyl-4-dimethylaminoethyl piperazine, 3-methoxy-N-dimethylpropylamine, N,N-diethyl-3-diethylaminopropylamine, dimethylbenzyl amine, bis(2-dimethylaminoethyl)ether, and the like. Tertiary amine catalysts are advantageously employed in an amount from about 0.01 to about 5, preferably about 0.05 to about 2 parts per 100 parts by weight of the isocyanate-reactive compound.

Exemplary organometallic catalysts include organic salts of metals such as tin, bismuth, iron, mercury, zinc, lead and the like, with the organotin compounds being preferred. Suitable organotin catalysts include dimethyltindilaurate, dibutyltindilaurate, stannous octoate and the like. Other suitable catalysts are taught, for example, in U.S. Pat. No. 2,846,408. Advantageously, about 0.001 to about 0.5 part by weight of an organometallic catalyst is used per 100 parts of the isocyanate-reactive compound.

Cross-linkers may be used, particularly in high resiliency slabstock foam, in order to improve load-bearing and processing. Suitable such cross-linkers include alkanolamines and other compounds of about 200 or lower equivalent weight having about 3-8, preferably about 3-4, active hydrogen-containing groups per molecule. Exemplary such compounds are glycerine and trimethylolpropane, as well as other alkylene triols. Preferred, however, are alkanolamines such as diethanolamine, triisopropanolamine, triethanolamine, diisopropanolamine, adducts of 4-8 moles of ethylene oxide and/or propylene oxide with ethylene diamine and the like, and ammonia and the like. Most preferred, on the basis of its optimum reactivity, is diethanolamine. When used, about 0.1 to about 4 parts of the cross-linker are advantageously employed per 100 parts of isocyanate-reactive compound.

Chain extenders may also be used to further improve the load-bearing of the foam. "Chain extenders," for the purposes of this invention, include compounds having two active hydrogen-containing groups per molecule and an equivalent weight from about 31 to about 300, preferably about 31 to about 150. Hydroxyl-containing chain extenders include the alkylene glycols and glycol ethers such as ethylene glycol, 1,3-propylene glycol, 1,4-butylene glycol, 1,6-hexamethylene glycol, diethylene glycol, triethylene glycol, dipropylene glycol, tripropylene glycol, 1,4-cyclohexanedimethanol and the like. Amine chain extenders include diethyltoluene diamine, phenylene diamine, methylene bis(o-chloroaniline), NaCl-blocked methylene bis(aniline), toluene diamine, aromatic diamines which are substituted for at least one of the carbon atoms adjacent to the amine groups with a lower alkyl group, and the like. Such chain extenders, when used, are advantageously employed in a minor amount, i.e., from about 2 to about 30 parts per 100 parts isocyanate-reactive compound. It is usually preferable, however, to prepare the foam in the substantial absence of a chain extender.

In order to make a stable foam, i.e., one which does not collapse or contain significant quantities of large pores, it is preferred to employ a surfactant which stabilizes the foaming reaction mixture against collapse until the mixture is sufficiently cured to maintain its cellular configuration. Suitable surfactants include siloxane/poly(alkylene oxide) copolymers as described, for example, in U.S. Pat. Nos. 3,887,500 and 3,957,842. The selection and use of such surfactants in preparing foams is well-known.

In the commercial production of slabstock foam, the components can be and typically are introduced individually to a mixing head where they are thoroughly blended and metered onto a bed where foaming takes place. However, preblending of the components, except for the polyisocyanate, can be done if desired. The components are advantageously at room temperature or a slightly elevated temperature when blended in the mixing head, although preheating may be necessary in some instances to melt components which are solid at room temperature.

In a third aspect, the invention is a flexible polyurethane foam prepared from the above-described isocyanate-reactive composition.

The foam of this invention is useful, for example, as bedding, furniture cushioning, padding, carpet underlayment, attached cushion carpet backing, automobile head rests, crash pads, door handles, head liners, seating and the like. This invention is particularly useful in applications wherein high load-bearing properties are required or where a low density, high water formulation is desired.

The flexible polyurethane foam of the present invention exhibits significant scorch reduction when compared to conventionally prepared flexible polyurethane foams, while maintaining all the other desirable physical properties, such as, for example, tensile strength, elongation, high resiliency, thermal stability.

The antioxidant/scorch evaluation is carried out using a microwave scorch test procedure. The microwave scorch test consists of a thermal treatment at an exposure of the foam to a desired microwave radiation for a given period of time. About 2 minutes (min) after completion of the microwave exposure, the foam bun temperatures are recorded and the bun put into a humidity controlled oven, set at about 60° C. for at least 50 min, and then cut into slices for scorch evaluation.

The samples, as prepared above, are then color evaluated using the LAB measuring system and a Hunter Lab Colorimeter. This test is a modification of the standard test method ASTM E-306. The samples are properly placed on the equipment. The sample's color is compared to a standardized white tile and reported as $\Delta E$, according to the Tristimulus Color Scale. In the Tristimulus Color Scale, a $\Delta E$ of about 80 represents a char colored foam and a $\Delta E$ of about 0 represents the standardized white tile. An optimum white colored foam would have a $\Delta E$ of about 5.

ILLUSTRATIVE EMBODIMENTS

The following examples are given to illustrate the invention and should not be interpreted as limiting it in any way. Unless stated otherwise, all parts and percentages are given by weight.

EXAMPLES 1-3

A series of samples is prepared by weighing 1700 grams (g) of glycerine initiated polyoxyalkylene triol into a 1 gallon (3.875 1) glass jar and adding the levels set forth in Table I of high molecular weight antioxidant. Then, each sample is heated to 100° C. for 30 min and then thoroughly mixed for 5 to 7 min. After complete dissolution of the antioxidant in the polyoxyalkylene triol, effective amounts of water, L-5810 surfactant (an organosilicon surfactant commercially available from Union Carbide), a 3:1 w/w mixture of Dabco 33LV/Niax A1 amine catalyst and stannous octoate, are added thereto. (Dabco 33LV is a mixture of 33% triethylene diamine and 67% dipropylene glycol, commercially available from Airpoducts Co. and Niax A1 is a is a mixture of 70% bis(dimethylamino-ethyl)ether and 30% dipropylene glycol, commercially available from Union Carbide). Aliquots of each sample are contacted with toluene diisocyanate in an excess of 20 percent (index of 120) and subjected to foaming conditions. The resulting foamed samples are submitted for antioxidant evaluation as described above and the results are given in Table I.

COMPARATIVE EXAMPLES A-C

Foam samples are prepared using the same reactants and following the same procedure of Examples 1-3 above, except for using the levels set forth in Table I of low molecular weight antioxidant. The resulting foamed samples are submitted for antioxidant evaluation as described above and the results are given in Table I.

TABLE I

|  | Example 1 | Example 2 | Example 3 | Comp. Exp. A* | Comp. Exp. B* | Comp. Exp. C* |
|---|---|---|---|---|---|---|
| Antioxidant[1] (Mw) |  |  |  |  |  |  |
| VANOX GT[2] (784) | 3920 | — | — | — | — | — |
| VANOX SKT[3] (1042) | — | 5205 | — | — | — | — |
| VANOX SWP[4] (382) | — | — | — | 2866 | — | — |
| TOPANOL 205[5] (836) | — | — | 6286 | — | — | — |
| TOPANOL CA[6] | — | — | — | — | 2714 | — |

TABLE I-continued

|  | Example 1 | Example 2 | Example 3 | Comp. Exp. A* | Comp. Exp. B* | Comp. Exp. C* |
|---|---|---|---|---|---|---|
| (543) BHT[7] (196) | — | — | — | — | — | 2946 |
| Scorch ΔE[8] | 44 | 49 | 49 | 66 | 67 | 59 |

*Not an example of the present invention
[1] ppm of antioxidant/(1.5 meq of antioxidant/100 g polyol); Mw = molecular weight
[2] tris(3,5-di-t-butyl-4-hydroxybenzyl)isocyanurate commercially available from RT Vanderbilt Inc.
[3] 3,5-di-t-butyl-4-hydroxyhydrocinnamic acid triester of 1,3,5-tris(2-hydroxyethyl)-s-triazine-2,4,6-(1H, 3H, 5H)trione commercially available from RT Vanderbilt Inc.
[4] 4,4'-butylidene-bis(6-t-butyl-m-cresol) commercially available from RT Vanderbilt Inc.
[5] 2,2-bis[4-(2-(3,5-di-t-butyl-4-hydroxyhydrocinnamoyloxy))ethoxyphenyl]propane commercially available from Imperial Chemical Industries
[6] 3:1 condensate of 3-methyl-6-t-butylphenol with crotonaldehyde commercially available from Imperial Chemical Industries
[7] 2,6-di-t-butyl-4-methylphenol commercially available from Uniroyal Co. under the trademark Naugard.
[8] ΔE measured according to Tristimulus Color Scale.

As mentioned before, the higher ΔE, the darker the foam coloring and hence the more susceptible the foam is to the scorch phenomena. Thus, it is readily apparent from the data shown in Table I, that the formulations of the present invention using high molecular weight antioxidants exhibit significantly reduced ΔE values, i.e., reduction of up to about 50%, therefore, significantly reduced scorch.

What is claimed is:

1. An isocyanate-reactive composition comprising an isocyanate-reactive compound having an equivalent weight of from about 400 to about 5,000, and a hindered phenolic antioxidant having a molecular weight greater than about 700 in an amount sufficient to reduce scorch up to about 50 percent when compared to a similar isocyanate-reactive composition having an equal number of equivalents of 2,6-di-tert-butyl-4-methylphenol.

2. The composition of claim 1 wherein the isocyanate-reactive compound has an equivalent weight of from about 1,000 to about 2,500.

3. The composition of claim 2 wherein the isocyanate-reactive compound is a polyether polyol.

4. The composition of claim 1 wherein the antioxidant is employed in amounts from 0.25 to 4.5 meq/100 g of isocyanate-reactive compound.

5. The composition of claim 4 wherein the antioxidant is employed in an amounts of 1.5 meq/100 g of isocyanate-reactive compound.

6. The composition of claim 4 wherein the antioxidant is selected from the group consisting of tris-(3,5-di-t-butyl-4-hydroxybenzyl)isocyanurate: 3,5-di-tert-butyl-4-hydroxyhydrocinnamic acid triester of 1,3,5-tris-(2-hydroxyethyl)-s-triazine-2,4,6-(1H,3H,5H)trione; 4,4'-butylidene-bis-(6-t-butyl-m-cresol); 2,2-bis[4-(2-(3,5-di-tert-butyl-4-hydroxyhydrocinnamoyloxy)) ethoxyphenyl] propane; 1,1,3-tris-(2-methyl-4-hydroxy-5-t-butylphenyl) butane.

7. The composition of claim 1 wherein the antioxidant has a molecular weight between 750 and 1,200.

8. A process for preparing a flexible polyurethane foam comprising reacting together an organic polyisocyanate with an isocyanate-reactive composition comprising an isocyanate-reactive compound having an equivalent weight of from about 400 to about 5,000, and an antioxidant comprising a hindered phenolic compound having a molecular weight greater than about 600 in an amount sufficient to reduce scorch up to about 50 percent when compared to a similar isocyanate-reactive composition having an equal number of equivalents of 2,6-di-tert-butyl-4-methylphenol, in the presence of a blowing agent and under conditions sufficient to form the polyurethane foam.

9. The process of claim 8 wherein the isocyanate-reactive compound has an equivalent weight of from about 1,000 to about 2,500.

10. The process of claim 9 wherein the isocyanate-reactive compound is a polyether polyol.

11. The process of claim 8 wherein the antioxidant is employed in amounts from 0.25 to 4.5 meq/100 g of isocyanate-reactive compound.

12. The process of claim 11 wherein the antioxidant is selected from the group consisting of tris-(3,5-di-t-butyl-4-hydroxybenzyl)isocyanurate: 3,5-di-tert-butyl-4-hydroxyhydrocinnamic acid triester of 1,3,5-tris-(2-hydroxyethyl)-s-triazine-2,4,6-(1H,3H,5H)trione: 4,4'-butylidene-bis-(6-t-butyl-m-cresol): 2,2-bis[4-(2-(3,5-di-tert-butyl-4-hydroxyhydrocinnamoyloxy)) ethoxyphenyl] propane; 1,1,3-tris-(2-methyl-4-hydroxy-5-t-butylphenyl) butane.

13. The process of claim 8 wherein the antioxidant has a molecular weight between 750 and 1,200.

14. The process of claim 8 wherein the scorch is reduced by 30 percent.

15. A flexible polyurethane foam prepared from the isocyanate-reactive composition of claim 1.

16. An isocyanate-reactive composition comprising an isocyanate-reactive compound having an equivalent weight of from about 400 to about 5,000; a hindered phenolic antioxidant having a molecular weight about 700, in an amount sufficient to reduce scorch up to about 50 percent when compared to a similar isocyanate-reactive composition having an equal number of equivalents of 2,6-di-tert-butyl-4-methylphenol; and a blowing agent.

17. The composition of claim 16 wherein the blowing agent is water.

18. The process of claim 8 wherein the blowing agent is water.

* * * * *